INVENTOR
MICHAEL J. MYLES
JOHN P. SPELLMAN
ATTORNEY

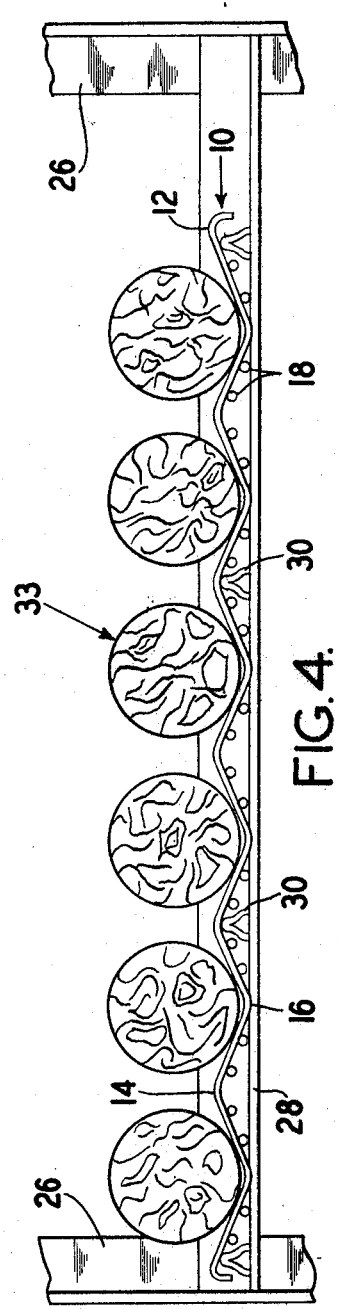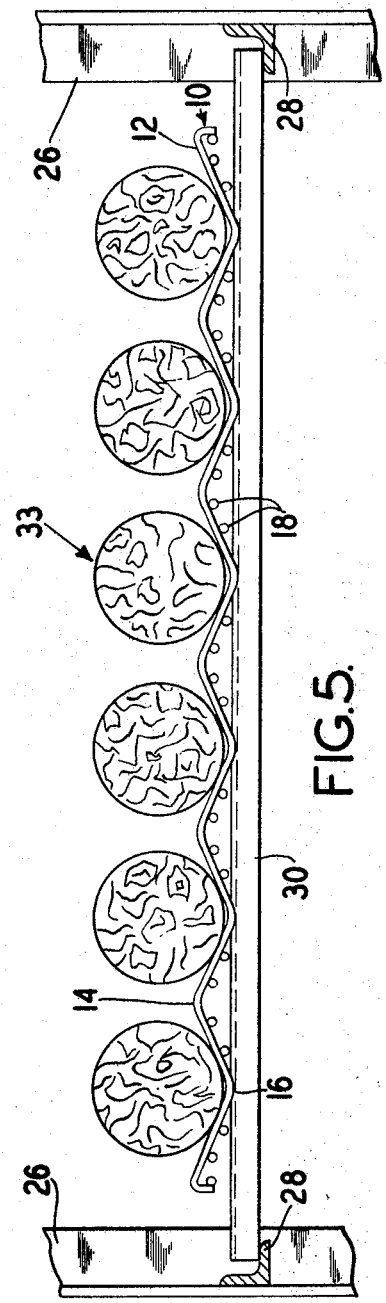

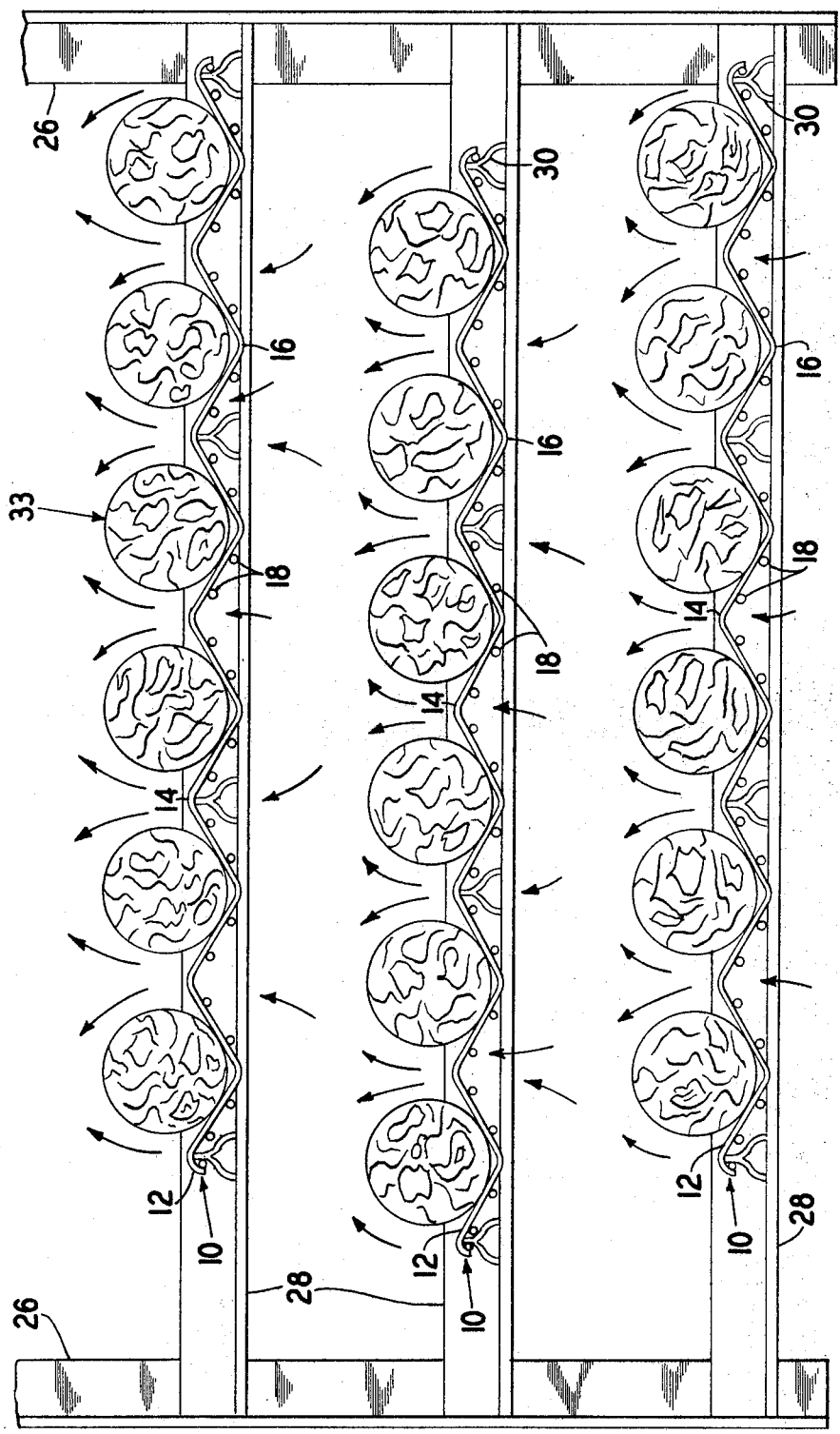

United States Patent Office 3,517,606
Patented June 30, 1970

3,517,606
APPARATUS FOR PROCESSING LARGE
SAUSAGE PRODUCTS
Michael J. Myles, Downers Grove, and John P. Spellman, Oak Lawn, Ill., assignors to Union Carbide Corporation, a corporation of New York
Filed Aug. 7, 1967, Ser. No. 658,922
Int. Cl. A47j 43/00
U.S. Cl. 99—450
4 Claims

ABSTRACT OF THE DISCLOSURE

A rigid, self-supporting grid-like member can be utilized to support encased food products horizontally during the processing of such food products. The grid-like member can be fabricated and assembled for use with conventional smoke cages.

---

The present invention relates to a new and useful apparatus for use in processing metal products. More particularly, the present invention relates to an apparatus for supporting large sausage products during processing thereof.

Large sausage products are typically made in elongated forms by stuffing comminuted meat emulsions into synthetic food casings. These food casings serve as molds to retain the meat emulsions stuffed therein in predetermined sizes and shapes during the cooking and curing of the encased meat emulsion and are generally fabricated from such materials as regenerated cellulose, fibrous reinforced regenerated cellulose, and the like.

Large sausage products, such as bologna, spiced ham, Vienna sausage and the like, which are intended for consumer use as packaged, pre-sliced items, are generally encased in food casings having a stuffed diameter of from between about 3½ to 5 inches, a length of from between about 40–60 inches and longer, and, when stuffed with a meat emulsion, weigh from between about 15–30 pounds.

Prior to being stuffed, one end of a food casing is closed by means well known to those skilled in the art, such as by tying, clipping or the like. After being stuffed with a meat emulsion, the remaining, open end of the food casing is also closed and one of the closed ends of the thusly stuffed casing is typically provided with a hanger loop from which the stuffed food casing is suspended during subsequent processing of the meat emulsion encased therein.

To suspend stuffed food casings during processing, a hanging means, such as a smoke stick, is laced through the hanger loops and the stuffed casings are then vertically suspended in smoke cages. When a smoke cage has been thusly filled with suspended, stuffed food casings, it is transferred to a smoke house wherein the encased meat emulsions are conventionally processed to obtain cooked and cured large sausage products.

The terms "smoke case," "smoke stick" and "smoke house" are terms commonly employed by those skilled in the art to denote, respectively, a rigid frame assembly in which stuffed food casings are vertically suspended, a hanger means, such as a rigid rod, by which the stuffed food casings are vertically suspended in the smoke cage and a processing chamber wherein the encased meat emulsions are processed by cooking and curing.

Processing large sausage products in this manner has many inherent disadvantages. For example, since the whole product is suspended vertically, the encased meat emulsion, which is in a semi-fluid state, has a tendency to gravitate toward the lower end of the casing. As a result, the upper portion of the product tends to become elongated thereby decreasing in circumference while the lower portion tends to become enlarged and increases in circumference. This causes the product to assume a tapered or pear-shape configuration. The resulting, non-uniform dimension of the product from end to end is undesirable and wasteful since the efficiency of automatic or semi-automatic slicing operations, which are subsequently utilized to prepare predetermined, weight-by-slice count packages of the food product, are adversely affected.

One solution to overcome this problem has been to cut off the non-uniform end portions of the sausage product and then either re-work them or discard them. In either event, this solution results in much product waste, increased labor, and monetary loss. Another approach to overcome this problem has been to employ food casings of extra long lengths, usually up to twice the capacity of commercial slicing equipment. After processing, the resulting products encased in these long length food casings are cut midway between the rounded portions at each end thereof so that they will fit in commercial slicing machines. The two rounded end portions are thereafter either re-worked or discarded. This solution, however, has given rise to other problems. For example, during processing the increased weight of the product frequently causes the hanger loop affixed to the end of the casing to slip on the casing thereby causing the encased meat emulsion to gravitate to an even greater degree toward the bottom of the casing and also increases the degree to which the constituents comprising the emulsion migrate toward the lower end of the casing. As a result, fat or jelly pockets are frequently formed in the encased meat emulsion thereby lowering the quality of the processed product. Occasionally, the hanger loop will break and the encased meat product will fall to the floor of the smoke house a total loss.

Other disadvantages common to processing both regular size and extra long length large sausage products according to present methods are that only a limited number of large sausage items can be vertically suspended from the smoke sticks of standard smoke cages and this number is further reduced when extra long length sausage items are processed. During processing, it is normal for the suspended sausage products to sway and contact each other resulting in inadequate and incomplete color development in the finished, encased products. Further, the smoke house capacity is limited in many packing plants and not enough space is available to provide additional processing facilities thereby giving rise to production problems which are becoming more acute under ever increasing production demands.

It is an object of the present invention, therefore, to provide an apparatus for processing large sausage products so that they will have substantially uniform dimensions from end to end.

Another object is to provide an apparatus that will accommodate a greater number of large sausage products of various diameters and lengths in close proximity to each other during processing.

These and other objects of the present invention will become more apparent from the ensuing description.

The objects of the present invention can be generally attained by providing a rigid, self-supporting, grid-like member upon which large sausage products can be horizontally disposed during processing. Since the grid-like member of the invention is rigid and thereby, self-supporting, the use of an additional frame or support members to provide or impart rigidity thereto is not required. In a preferred embodiment of the invention, the grid-like member is fabricated to be of a size so that it can be readily utilized with conventional smoke cages and/or smoke sticks.

The rigid, self-supporting, grid-like member of the invention generally comprises, in combination, two groups of parallelly disposed wire members, the first group of which is disposed at right angles or transverse to the second group, the two groups of wire members being attached to each other at predetermined, fixed points. In a preferred embodiment, the first group of parallelly disposed wire members are fabricated to have alternating peaks and valleys and, when fully assembled, completely overlie the second group of wire members to which they are attached so that the second group of wire members act to retain and fix the first group of wire members in a set position.

The apparatus of the present invention will become more clear when considered together with the accompanying drawing which is set forth as being exemplary thereof and is not intended, in any way, to be limitative thereof and wherein;

FIGS. 4 and 5 are end elevational views, part in section, of two different embodiments of the apparatus depicted in FIG. 3; and FIG. 6 is an end elevational view, part broken away and part in section, illustrating several tiers of the apparatus of the present invention showing large sausage products placed thereon in staggered alignment.

Figure 1:
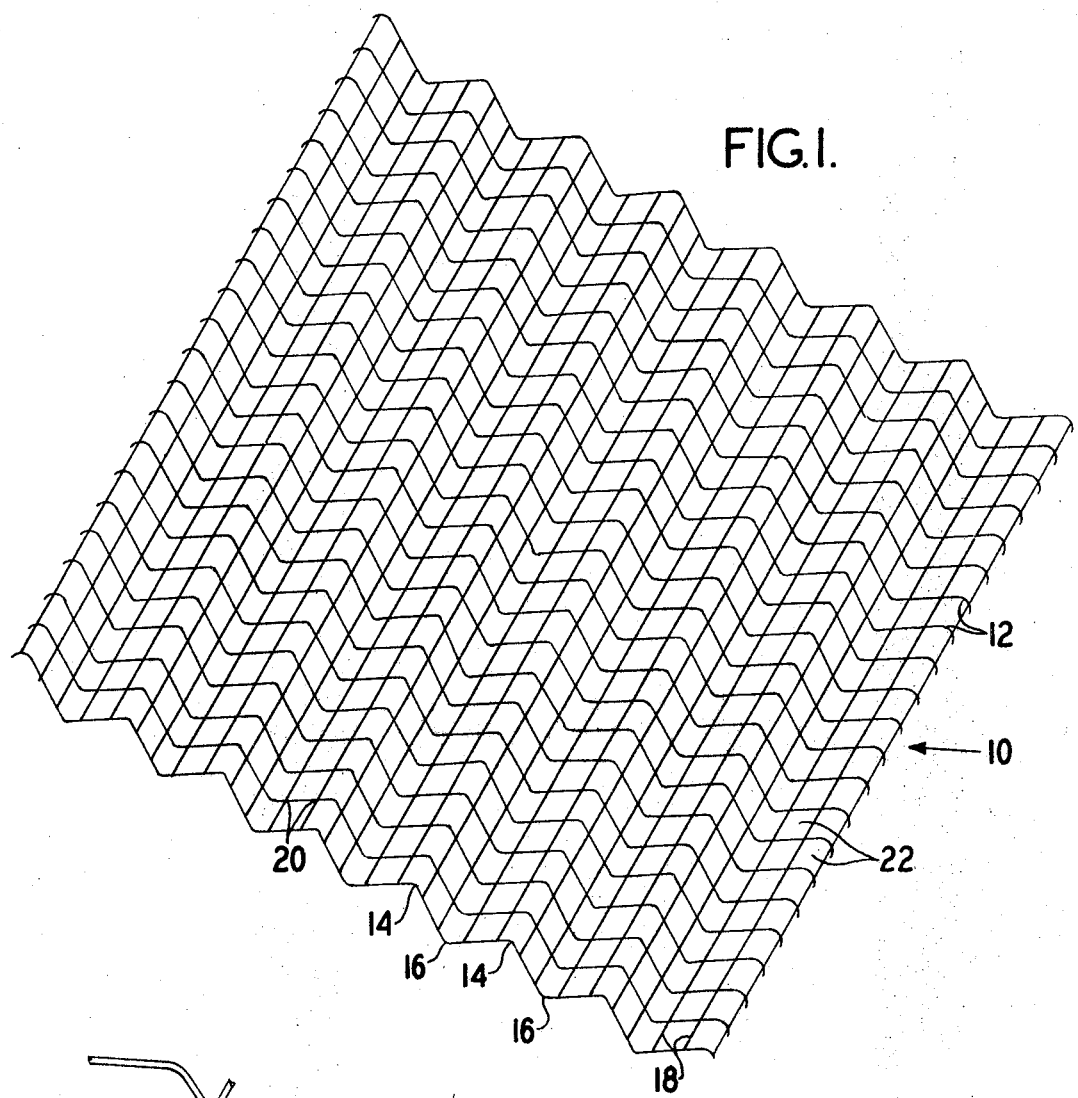
FIG. 1 is a perspective view illustrating one embodiment of the apparatus of the present invention.
Figure 2:
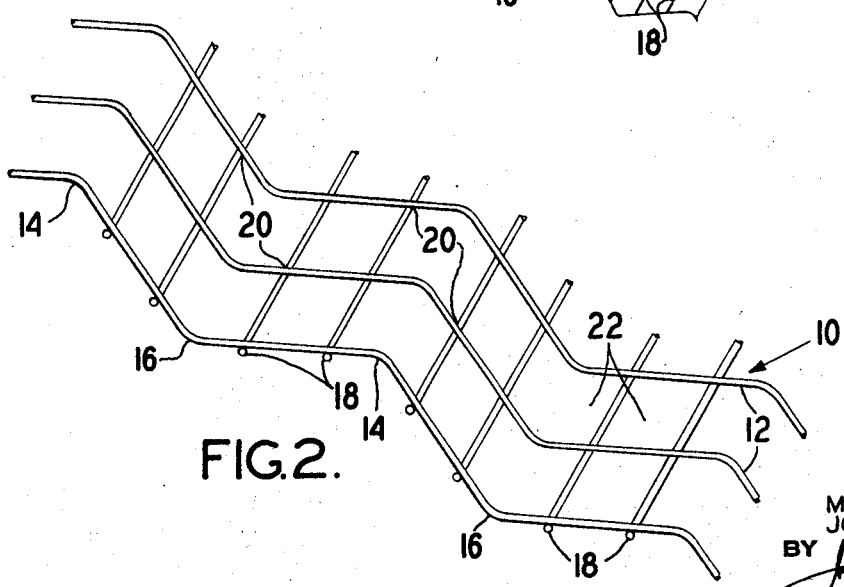
FIG. 2 is an enlarged perspective view of a portion of the apparatus of FIG. 1.

Turning now to the drawing wherein like reference numerals denote like parts there is shown in FIGS. 1 and 2 the apparatus of the present invention fabricated in the form of a rigid, self-supporting grid-like member generally designated by reference numeral 10. When completely fabricated and assembled, the finished, grid-like member 10 preferably has nominal dimensions of about 38 inches in width and 40 inches in length so that it can be readily placed in and utilized in conjunction with commercially available smoke cages and smoke sticks as is more fully described hereinbelow.

In fabricating grid-like member 10, a first group of parallelly disposed wire members 12 are attached to a second group of parallelly disposed wire members 18 which are placed at right angles or transverse to the first group of wire members 12. The first group of wire members 12 are bent to have alternating peaks 14 and valleys 16 formed therein and can be conveniently and conventionally attached to the second group of wire members 18 by welding the two groups of wire members 12, 18 to each other at those points where they cross each other. In this manner, the first group of wire members 12 can be fixed and retained in position when the grid-like member 10 is fully assembled. To accomplish this however, the groups of wire members 12, 18 need not be attached to each other at every point where they cross each other but only at those points 20 as will be sufficient to retain the first group of wire members 12 in a fixed position upon completion of the assembly of the grid-like member 10, as is indicated in FIG. 2. Preferably, the groups of wire members 12 and 18 are attached to each other at every point where they cross each other. When fully assembled, the first and second groups of wire members 12, 18 will define a plurality of interstices 22 in the grid-like member 10.

In a preferred embodiment of the invention, the first group of wire members 12 having the alternating peaks 14 and valleys 16 formed therein completely overlie the second group of wire members 18 which are substantially straight. When attaching the first group of wire members 12 to the underlying, second group of wire members 18, it is also preferred that none of the individual wires of the second group of wire members 18 be positioned at either the peaks 14 or the valleys 16 formed in the first group of wire members 12. For example, the individual wires comprising the second group of wire members 18 can be attached (as by welding) to the first group of wire members 12 intermediate each adjacent peak 14 and valley 16 as illustrated in FIG. 2. The purpose for assembling the grid-like member 10 in this manner is related to the use of the grid-like member 10 in conjunction with conventional smoke cages and smoke sticks which is discussed more fully hereinbelow.

When completely assembled, the dimensions of the grid-like member 10 of the present invention should preferably be such that the interstices 22 measure about 1½ inches square and the distance between the points of adjacent peaks 14 and the points of adjacent valleys 16 is about 5 inches. The vertical distance between the apex of one peak 14 to the depth of an adjacent valley 16 should be about 1½ inches.

While the type of wire utilized to fabricate the grid-like member 10 of the present invention is not critical, it is preferred to use carbon steel wire members having a diameter of about 0.120 of an inch. Since the grid-like member 10 is to be used in connection with food products, the wire members should also preferably be rust resistant and capable of being sanitized. Exemplary of such wire members are those which have been tin coated or which are fabricated from stainless steel and the like. When carbon steel or a material having a high coefficient of heat transfer is selected for use as the wire members, it is preferred that these types of wire members be coated with a material having a low coefficient of heat transfer and preferably a low coefficient of friction such as nylon, poly(tetrafluoroethylene), available under the trade name Teflon, and the like. When thusly coated, a smooth, durable, sanitary surface is provided which is easy to maintain and keep clean. Further, such a coating also acts as a heat insulating medium covering the highly conductive metal of the grid-like member 10 and thereby eliminates or substantially reduces any "hot spots" in the assembled grid-like member 10 while permitting large sausage products to be easily placed thereon and removed therefrom. Since such a coating acts as a heat insulating medium, it serves to prevent premature localized coagulation, drying, cooking and curing of the portions of the encased meat emulsion lying adjacent to the wire members. Preferably, the coating is applied to the grid-like member 10 after it has been fully assembled so that a filet of coating material forms at those points where the two groups of wire members cross each other thereby serving to prevent any foreign matter from becoming lodged in the grid-like member at these points.

When uncoated, carbon steel wire membesr were used, they were found to have a substantially high degree of heat conductivity which tended to cause premature curing of those portions of some types of encased meat emulsions at those points where the encased meat emulsions were in contact with the wire members. It was also found that these uncoated wire members in contact with the encased meat emulsions at these points created localized hot spot areas so that the casing and the encased meat emulsion were darkened at these points of contact. As a result, large sausage products were obtained which were unsightly and undesirable and particularly objectionable for use in sliced, prepackaged meat items.

Figure 3:
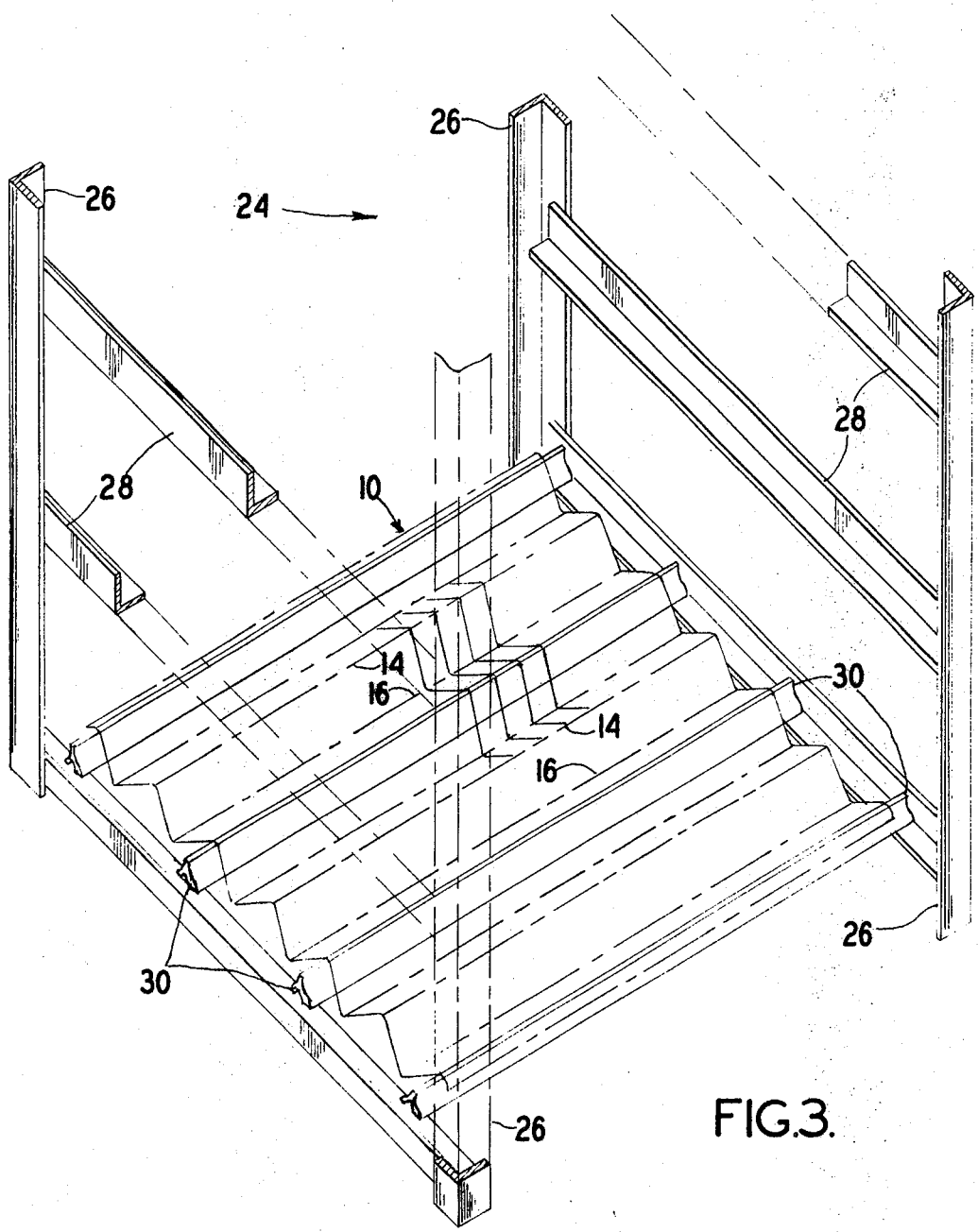
FIG. 3 is a perspective view, part broken away and part in phantom, illustrating the apparatus of the present invention positioned in and utilized in conjunction with a conventional smoke cage and smoke sticks.

In FIG. 3, there is shown a conventional smoke cage generally designated by reference numeral 24 of the type commonly employed to vertically suspend and process large sausage products. Smoke cage 24 is typically constructed from heavy gauge steel or iron angle members and fabricated to have vertical corner members 26 and a plurality of parallelly disposed horizontal members 28 positioned therebetween. Smoke sticks 30, which can be the same as or similar to those presently employed to vertically suspend large sausage products, are disposed between the horizonta members 28.

As illustrated in FIGS. 3 and 4, a grid-like member 10 of the present invention is shown disposed between opposed, horizontal members 28 and over smoke sticks 30 which can be utilized to further support the grid-like member 10 with respect to the smoke cage 24. The smoke sticks 30 can be disposed parallel to the peaks 14 and the valleys 16 of the grid-like member 10 and, when so disposed, are positioned in the triangular spaces defined by the peaks 14 in contact with the horizontal members 28 of the smoke cage 24. However, this positioning of the grid-like member 10 relative to the smoke sticks 30 is not critical and the grid-like member 10 can also be positioned in the smoke cage 24 so that the peaks 14 and valleys 16 are disposed transverse to the smoke sticks 30 as shown in FIG. 5.

It should be understood that regardless of the manner in which the grid-like member 10 is placed in a smoke cage 24 with respect to the smoke sticks 30, the smoke sticks 30 are prevented from coming into contact with or being placed in relative proximity to a large sausage product by the manner in which the second group of wire members 18 have been positioned and attached relative to the first group of wire members 12 as has been described hereinabove. This is more clearly shown in FIGS. 4 and 5, wherein the large sausage products are generally designated by reference numeral 33. In those instances where the second group of wire members 18 have a high coefficient of heat transfer and/or are uncoated, positioning and attaching these wire members to the first group of wire members 12 in the manner described above and shown in the figures will also assure that the large sausage product 33 will not come into contact with or be in close proximity to these wire members 18 thereby avoiding the occurrence of undesirable hot spots in the subsequently cooked and cured large sausage products 33.

In FIG. 6 there is depicted a plurality of large sausage products 33 positioned on a plurality of grid-like members 10 of the present invention which are shown positioned in a tier in a smoke cage 24.

Preferably, the individual grid-like members 10 are fabricated and then arranged in the smoke cage 24 so that the large sausage products 33 are vertically staggered from row to row in the tier. This provides a labyrinthine path through which the heated air and gaseous curing means generally untilized during processing must travel as indicated by the directional arrows in FIG. 6. This arrangement has also been found to greatly improve the efficiency of smoke house operations and the processing of large sausage products.

By utilizing the apparatus of the present invention in conjunction with conventional smoke house equipment, conversion costs are reduced to a minimum. It has been found that the capacity of the smoke house smoke cages utilizing the apparatus of the present invention can be materially and significantly increased from about 30 to 40%. Heretofore, the capacity of smoke house smoke cages has been limited since generous spacing has to be provided between the vertically suspended large sausage products in order to have them avoid prolonged contact with each other during processing. Conversely, the apparatus of the present invention provides an orderly, closely spaced means for processing large sausage products thereby providing optimum product curing capacity and efficiency.

Although the apparatus of the present invention has been described with particular reference to several, preferred embodiments thereof, it should be understood that various modified forms thereof can be utilized in the same or similar manner as has been set forth herein. For example, when stainless steel, tin coated or properly coated carbon steel wire members are employed, the first group of wire members need not completely overlie the second group of wire members but could be interwoven. Further, when stainless steel, tin coated or properly coated carbon steel wire members are utilized so that the first group of wire members completely overlie the second, large sausage products can be placed in contact with either side of the subsequently assembled grid-like member. Additionally, while the apparatus of the present invention has been described for use in connection with processing large sausage products, it should be further understood that it can be utilized with equal facility and efficiency in connection with other types or sizes of food products which are subjected to the same or similar types of processing methods.

Hence, while the present invention has been described in some detail and with particularity, it should be understood that changes, modifications and alterations can be made therein in addition to those set forth and suggested hereinabove, without departing from the scope and spirit of the invention.

What is claimed is:

1. A rack for supporting a plurality of large, cylindrical sausage products in smokehouse processing, which rack comprises:
   (a) a first group of parallel, spaced wires;
   (b) a second group of parallel, spaced wires underlying said first group transverse thereto and welded thereto at each point of contact therewith;
   (c) said first group of wires being shaped to provide a plurality of alternating aligned peaks and product-receiving valleys adapted to cradle and support individual sausage products out of physical contact with each other;
   (d) said first group of wires being so arranged as to come into substantially tangential contact only with such products when the same are in such valleys and being spaced apart a distance of the order of 1½ inches so as to prevent slumping or other deformation of the sausage products when such products are subjected to smokehouse processing temperatures and conditions while supported thereon;
   (e) said second group of wires being so positioned with respect to said first group of wires in such structure as to prevent physical contact of said second group of wires with such products when the same are in such valleys and being spaced apart a distance of the order of 1½ inches so that the open spaces between the two groups of wires will be of such size as to permit free access of circulating smoke to substantially all surfaces of such products when the same are subjected to smokehouse processing on said structure;
   (f) at least said first group of wires having a coating thereon of a material having a low coefficient of heat transfer and a low coefficient of friction;
   (g) said coating inhibiting localized overheating and premature cooking of such products at said tangential points of contact of such products with said first group of wires during smokehouse processing of such products and permitting easy removal of such products without damage thereto from said structure after processing.

2. A rack as defined by claim 1 in which both of said groups of wires are coated with said material.

3. A rack as defined by claim 1 in which said wires of said second group are in contact with the wires of said first group only at points removed from said peaks.

4. A rack as defined by claim 1 in which said coating material is nylon.

References Cited

UNITED STATES PATENTS

| | | | |
|---|---|---|---|
| 1,942,582 | 1/1934 | Vogt. | |
| 3,379,118 | 4/1968 | Perez | 99—442 |
| 124,296 | 3/1872 | Smith | 99—450 XR |
| 949,668 | 2/1910 | Swinscoe | 52—660 |
| 1,266,912 | 5/1918 | Bradbury. | |
| 2,439,283 | 4/1948 | Bennett | 99—450 |

(Other references on following page)

UNITED STATES PATENTS

| | | | |
|---|---|---|---|
| 3,032,203 | 5/1962 | Romero | 220—19 XR |
| 3,085,694 | 4/1963 | Jones | 211—181 XR |
| 3,256,838 | 6/1966 | Booras | 107—57 XR |
| 3,305,125 | 2/1967 | Chesley | 220—19 |

FOREIGN PATENTS

| | | |
|---|---|---|
| 997,550 | 9/1951 | France. |

WALTER A. SCHEEL, Primary Examiner

A. O. HENDERSON, Assistant Examiner

U.S. Cl. X.R.

211—181; 17—44.4; 99—448